United States Patent
Katase

(10) Patent No.: US 7,237,323 B2
(45) Date of Patent: Jul. 3, 2007

(54) METHOD FOR MANUFACTURING A MAGNETIC HEAD

(75) Inventor: Shunichi Katase, Tokyo (JP)

(73) Assignee: TDK Corporation, Tokyo (JP)

( * ) Notice: Subject to any disclaimer, the term of this patent is extended or adjusted under 35 U.S.C. 154(b) by 53 days.

(21) Appl. No.: 10/936,733

(22) Filed: Sep. 9, 2004

(65) Prior Publication Data

US 2005/0030668 A1 Feb. 10, 2005

Related U.S. Application Data

(63) Continuation of application No. 10/159,127, filed on Jun. 3, 2002, now abandoned.

(30) Foreign Application Priority Data

| Jun. 6, 2001 | (JP) | ............................. 2001-170647 |
| Jun. 6, 2001 | (JP) | ............................. 2001-170648 |

(51) Int. Cl.
*G11B 5/127* (2006.01)
*H04R 31/00* (2006.01)

(52) U.S. Cl. ............................. 29/603.16; 29/603.12; 29/603.13; 29/603.15; 29/603.18; 216/65; 360/234.7; 451/5; 451/41

(58) Field of Classification Search ............................. 29/603.12–603.16, 603.18; 310/234.7; 451/5, 41; 216/65; 360/234.7
See application file for complete search history.

(56) References Cited

U.S. PATENT DOCUMENTS

| 5,469,312 | A |   | 11/1995 | Watanabe et al. |
| 5,473,486 | A |   | 12/1995 | Nepela et al. |
| 5,617,273 | A |   | 4/1997 | Carr et al. |
| 5,759,087 | A | * | 6/1998 | Masumura et al. ............ 451/41 |
| 5,995,324 | A |   | 11/1999 | Haddock et al. |
| 6,477,019 | B2 |  | 11/2002 | Matono et al. |

(Continued)

FOREIGN PATENT DOCUMENTS

JP 62-31016 2/1987

(Continued)

OTHER PUBLICATIONS

"The effect of slider roughness on asperity testing of thin-film media"; Clark, B.K.; Magnetics, IEEE Transactions on vol. 29, Issue 1, Part 2; Jan. 1993; pp. 235-240.*

*Primary Examiner*—Paul D. Kim
(74) *Attorney, Agent, or Firm*—Oblon, Spivak, McClelland, Maier & Neustadt, P.C.

(57) ABSTRACT

A method of making a magnetic head having an air bearing surface (ABS) composed of a flat and smooth worked surface and having a reduced step produced between a rail portion on the ABS and an element portion. Steps of the method include forming an electromagnetic transducing element including an insulating layer on a board, and then removing only a specific plane of the board opposed to a magnetic recording medium up to a first predetermined depth. Forming an insulating film composed of the same material as that of the element insulating layer on the surface of the board after the removal. Polishing the surface of the element portion and then the insulating film is polished by a chemical mechanical polishing method till the element is exposed. Then forming a recessed portion having a second predetermined depth on the insulating film.

11 Claims, 4 Drawing Sheets

U.S. PATENT DOCUMENTS 6,683,753 B1 * 1/2004 Lille .................. 360/235.1

FOREIGN PATENT DOCUMENTS

| JP | 5-189722 | 7/1993 |
|---|---|---|
| JP | 2509909 | 4/1996 |
| JP | 2715825 | 11/1997 |
| JP | 10219300 A * | 8/1998 |
| JP | 11-110935 | 4/1999 |
| JP | 2000-339620 | 12/2000 |

* cited by examiner

METHOD FOR MANUFACTURING A MAGNETIC HEAD

CROSS-REFERENCE TO RELATED APPLICATIONS

This application is a continuation application of U.S. application Ser. No. 10/159,127, flied Jun. 3, 2002, now abandoned and claims the benefit of priority to Japanese Patent Applications No. 2001-170647, filed Jun. 6, 2001, and No. 2001-170648, filed Jun. 6, 2001, the entire contents each of which are incorporated herein by reference.

BACKGROUND OF THE INVENTION

1. Field of the Invention

The present invention relates to a thin film magnetic head to be used in a hard disk device (hereinafter referred to as "HDD"), and more particularly to a thin film magnetic head coping with a magnetic recording medium having a high recording density, a manufacturing method thereof, a head gimbal assembly using the thin film magnetic head, and a HDD using the thin film magnetic head.

2. Description of Related Art

A magnetic head is mainly composed of an element for recording or reproducing information to or from a magnetic recording medium and the substrate on which the element is formed. The magnetic head is configured such that the element is opposed to a track portion on the surface of the magnetic recording medium and the magnetic head (or the substrate) itself automatically floats above the magnetic recording medium by a predetermined interval at the time of recording or reproducing of the information.

As the recording density of a HDD becomes higher, the performance of a thin film magnetic head is required to be higher. The requirement includes it that the tracks on a magnetic recording medium should be narrower. For achieving the improvement of the electromagnetic conversion efficiency of the magnetic head in response to the aforesaid requirement, it becomes important how to control the interval between the magnetic recording medium and the magnetic head. Now, the configuration of a magnetic head, a manufacturing method of the magnetic head having the configuration, and the like in related art are briefly described.

A schematic drawing of the bottom face of a magnetic head 1 viewed from the side of a magnetic disk is shown in FIG. 4. A macrograph of a cross section at a line 5-5 in FIG. 4, especially as to an element portion, is shown in FIG. 5. The magnetic head 1 is composed of an element portion 22 and a slider 20. The element portion 22 is formed at a tip portion of a nearly cuboid ceramic board such as alumina titanium carbide (ALTIC), and performs recording and reproducing of information to the magnetic disk. The slider 20 is made of a ceramic board.

The element portion 22 is formed on the ceramic board by means of a thin film forming technique, a thin film working technique and the like, all being used in, for example, a semiconductor manufacturing process. As being exemplified in FIG. 5, the element portion 22 is composed of a reproducing element portion 22a including a reproducing element and a recording element portion 22b including a recording element. The reproducing element portion is formed by the formation of the following layers on one end face of the ceramic board 101 in order and by the working of them. The layers are an insulating layer 102 made from, for example, alumina, a lower part shielding layer 103 of the reproducing element portion, which layer 103 is made from a magnetic material, a shield gap layer 104 made from an insulating material such as alumina or the like, a reproducing element 105 such as an MR element or the like and an electrode layer (not shown) connected with the reproducing element 105 electrically, and an upper part shielding gap layer 107 made from an insulating material such as alumina or the like.

The recording element portion is formed by the formation of the following layers on the upper part shielding gap layer 107 in order and by the working of them. The layers are a lower part magnetic pole layer 108 for the recording element, which layer 108 is made from a magnetic material and works also as an upper part shielding layer of the reproducing element portion; a recording gap layer 109 made from an insulating material such as alumina or the like; a thin film coil 112, which is made from copper or the like, being an electric conductor, and is separated by the insulating material; and an upper magnetic pole layer 116 made from a magnetic material. After the formation of the layers and the working or them, an overcoat layer 117 made from alumina or the like is formed, and then the element portion is completed.

After the formation of the element portion 22, the bottom face of the magnetic head 1, or the bottom face of the slider 20 (the surface 110a of the board 101 shown in FIG. 5), is further worked in order that the bottom face operates as a specific plane, or an air bearing surface (hereinafter referred to as "ABS") to the magnetic disk. The specific plane has a nearly perpendicular positional relation to the end face of the board 101, on which the element portion is formed. The ABS concretely makes the magnetic head 1 operate such that the slider floats above the surface of the magnetic disk by a extremely slight amount of interval by means of an air flow produced by the rotation of the magnetic disk and the amount of the floating is fixed. In the example shown in the drawings, a recessed portion 21b is formed by the scraping of a flat surface by ion milling or the like, and the other portion where the scraping is not performed is formed as a projecting portion being a rail 21a.

By the performance of the working described above, it becomes possible to float the magnetic head 1 above the surface of the magnetic disk at a predetermined height and to hold it. On the other hand, for the performance of recording and reproducing at a desired signal strength to the magnetic disk, it is needed to set an MR height designated by Mt in the drawing as to the reproducing element at a predetermined value, or to set a throat height designated by St or the like as to the recording element at a predetermined value. Generally, polishing working of the bottom face of the slider 20 is performed for the setting of the MR height or the like to the predetermined values.

Conventionally, the precision of the values of the MR height and the like is heightened by the heightening of the precision of working at the time of the polishing of the bottom face of the slider 20 (or the surface 101a of the board 101). Moreover, the precision of the flatness and the roughness of the rail 21a is heightened by the improvement of the precision of polishing conditions. The interval between the magnetic disk and the recording and reproducing element is controlled by the achievement of the heightening of the precision of such values, the optimization of the shape of the recessed portion 21b and the improvement of the precision of the working of the recessed portion.

As described above, the working for making the MR height and the like to be the predetermined values, the working for making the rail surface 21a flat, and the like after the formation of the element portion 22 are generally performed by means of polishing working using, for example, a diamond paste and a polishing plate composed of a soft metal or the like. However, the polishing speeds of the ceramic board 101, the thin film portions 102, 104, 107, 109 and 117 made from an insulating material such as alumina, the reproducing element portion 105 such as the MR element, and the magnetic thin films 103, 108 and 116 are different from each other. Consequently, steps are formed between the board surface 110a and the end faces of the aforesaid respective thin films.

Consequently, there is the possibility that a desired MR height and the like cannot be obtained, or the possibility that the interval between the surface of the magnetic disk and the element portion 22 cannot be kept to a predetermined value owing to the steps even if the desired MR height can be obtained. Moreover, there is the possibility that the steps cause a problem when the interval between the magnetic disk and the element becomes narrower than the present interval between them, though the steps are allowed in the present interval. Furthermore, it can be considered that the surface state of the board surface 110a and the surface state of the element portion 22 after polishing are different from each other besides the formation of the steps. The difference between the surface states has the possibility of exerting the influence to disturb an air flow on the ABS together with the steps.

Moreover, as described above, the formation of the recessed portion 21b to the board surface 111a is performed by the ion milling or the like. However, it is not easy to work the ALTIC board to be flat and uniform. Consequently, there is the case where very little irregularities, undulations or the like are produced on the bottom face of the recessed portion 21b. In the case where the irregularities or the like are produced, too, the influence of them is exerted as the interval between the magnetic disk and the element becomes narrower. Consequently, there is the possibility that the amount of the float of the magnetic head cannot stably be obtained.

It is also considerable to achieve the aforesaid flat making of the rail surface, the reduction of the steps and the working of the recessed portion 21b by using a corrosive liquid having selectivity. However, in the elements composed of a plurality of thin films laminated on one another, because the speed of corrosion has dependence to film qualities and the speed of corrosion of ALTIC itself changes in very little regions, it is actually difficult to obtain a smooth flat surface and the like by the corrosive liquid.

Moreover, as described above, the working of making the MR height and the like after the formation of the element portion 22 to be the predetermined values, the working for making the rail surface 21a to be flat, or the like is generally performed by means of the polishing working using, for example, a diamond paste and a polishing plate composed of a soft metal, or the like. The polishing working applies a shearing stress to a material to be an polishing object, and generates a partial ductile deformation or the shearing of the material on a surface to be polished. Thereby, the polishing working is done by performing the microscopic removal of the material. Consequently, it is considerable that a work-affected layer where crystallinity or the like in the magnetic layers has changed by the shearing stress or the like or a defect or the like induced by the sharing stress is generated in the material.

If such a work-affected layer or the like is produced in, for example, the MR element, there is the possibility that the electromagnetic characteristics thereof are also affected by the work-affected layer. It is considerable that these influences become remarkable in a magnetic head coping with high density recording in which the MR height is small.

Moreover, in the aforesaid polishing work, there is the case where a shearing stress is applied in a direction perpendicular to the plane on which each film is formed, for example, in a TMR element having the structure in which several atomic layers (equal to or less 1 nm) of an insulating thin film are put between magnetic films. In this case, it can happen, the case where the magnetic thin film on one side is elongated in the direction perpendicular to the film surface thereof owing to the ductility thereof and to be touched with the magnetic thin film on the other side and thereby the insulating state between them is broken.

Owing to the reasons described above, it is examined to use working methods such as the ion milling, reactive ion etching (RIE) and the like in addition to the conventional polishing working or as a post-process of the polishing working. However, there is the problem that these working methods have selectivity to working objects and the working speeds change according to the working objects. When the aforesaid element is exemplified, the polishing speeds to the following portions differ from one another: the ceramic board 101; the thin film portions 102, 104, 107, 109 and 117, each being made from an insulating material such as alumina or the like; the reproducing element portion 105 such as the MR element or the like; and the magnetic thin films 103, 108 and 116. Consequently, the steps are produced between the board surface 110a and the end faces of the aforesaid respective thin films as shown in FIG. 5.

Consequently, there is the possibility that a desired MR height and the like cannot be obtained, or the possibility that the interval between the surface of the magnetic disk and the element portion 22 cannot be kept to a predetermined value owing to the steps even if the desired MR height can be obtained. Moreover, there is the possibility that the steps cause a problem when the interval between the magnetic disk and the element becomes narrower than the present interval between them, though the steps are allowed in the present interval. Furthermore, it can be considered that the surface state of the board surface 110a and the surface state of the element portion 22 after polishing are different from each other besides the formation of the steps. The difference between the surface states has the possibility of exerting the influence to disturb an air flow on the ABS together with the steps.

SUMMARY OF THE INVENTION

The present invention was devised to solve the aforesaid problems. The invention aims to provide a magnetic head having an ABS composed of a worked surface being flat and smooth and having a reduced step to be produced between a rail portion and an element portion, a manufacturing method of the magnetic head, a head gimbal assembly having the magnetic head, and a HDD having the magnetic head.

Moreover, the present invention was devised to solve the aforesaid problems. The invention aims to provide a manufacturing method of a magnetic head, which method can prevent the producing of a work-affected layer or the like or can remove a produced work-affected layer at the time of performing the working of the magnetic head for making an MR height and the like to be predetermined values.

For solving the aforesaid problems, a magnetic head according to the present invention is a magnetic head including at least either of a recording element and a reproducing element, each being formed by lamination of a plurality of insulating layers, a conductive layer and a magnetic layer on an end face of a substrate and by work of each of the layers to a predetermined shape, the magnetic head comprising: a recessed portion on a specific plane opposed to a magnetic recording medium to be an object which the elements record information on or reproduce information from, wherein a part of the specific plane except at least the conductive layer and the magnetic layer in the portion of the elements, a bottom face of the recessed portion and a side wall portion of the recessed portion are made from a same material.

Incidentally, in the magnetic head according to the present invention, the same material may be alumina, and the material of the bottom face and the side wall of the recessed portion may differ from a material of the substrate.

Moreover, for solving the aforesaid problems, a head gimbal assembly according to the present invention is a head gimbal assembly using a magnetic head including at least either of a recording element and a reproducing element, each being formed by lamination of a plurality of insulating layers, a conductive layer and a magnetic layer on an end face of a substrate and by work of each of the layers to a predetermined shape, the magnetic head comprising: a recessed portion on a specific plane opposed to a magnetic recording medium to be an object which the elements record information on or reproduce information from, wherein a part of the specific plane except at least the conductive layer and the magnetic layer in the portion of the elements, a bottom face of the recessed portion and a side wall portion of the recessed portion are made from a same material.

Moreover, for solving the aforesaid problems, a hard disk device according to the present invention is a hard disk device using a magnetic head including at least either of a recording element and a reproducing element, each being formed by lamination of a plurality of insulating layers, a conductive layer and a magnetic layer on an end face of a substrate and by work of each of the layers to a predetermined shape, the magnetic head comprising: a recessed portion on a specific plane opposed to a magnetic recording medium to be an object which the elements record information on or reproduce information from, wherein a part of the specific plane except at least the conductive layer and the magnetic layer in the portion of the elements, a bottom face of the recessed portion and a side wall portion of the recessed portion are made from a same material.

Moreover, for solving the aforesaid problems, a manufacturing method of a magnetic head according to the present invention is a manufacturing method of a magnetic head comprising: a step of forming an element portion including at least either of a recording element and a reproducing element by laminating a plurality of insulating layers, a conductive layer and a magnetic layer on an end face of a substrate and by working each of the layers to a predetermined shape; a first polishing step of polishing a specific plane of the substrate, the specific plane being opposed to a magnetic recording-medium, which the elements record information on or reproduce information from, and a specific plane of the element portion, the specific plane being opposed to the magnetic recording medium in the element portion; a removal step of removing only the specific plane of the substrate up to a first predetermined depth; a film forming step of forming an insulating film on a surface of the specific plane of the substrate after removing the specific plane to the predetermined depth of the substrate and on a surface of the specific plane of the element portion; a second polishing step of polishing the insulating film till at least either of the conductive layer and the magnetic layer in the element portion is exposed; and a recessed portion forming step of forming a recessed portion having a predetermined shape and a second predetermined depth on the insulating film after the second polishing step; wherein the first predetermined depth is deeper than the second predetermined depth.

Incidentally, in the manufacturing method of a magnetic head according to the present invention, the insulating film formed on the surface of the specific plane of the substrate and the surface of the specific plane of the element portion may be made from a same material as that of any one of the plurality of insulating layers forming the element portion. Furthermore, the second polishing step may include a chemical mechanical polishing method using an abrasive liquid adjusted to be pH 5-7.

For solving the aforesaid problems, a manufacturing method of a magnetic head according to the present invention is a manufacturing method of a magnetic head comprising: a step of forming an element portion including at least either of a recording element and a reproducing element by laminating a plurality of insulating layers, a conductive layer and a magnetic layer on an end face of a substrate and by working each of the layers to a predetermined shape; a first polishing step of polishing a specific plane of the substrate, the specific plane being opposed to a magnetic recording medium, which the elements record information on or reproduce information from, and a specific plane of the element portion, the specific plane being opposed to the magnetic recording medium in the element portion; a removal step of removing only the specific plane of the substrate up to a predetermined depth; a film forming step of forming an insulating film on a surface of the specific plane of the substrate after removing the specific plane to the predetermined depth of the substrate and a surface of the specific plane of the element portion; and a second polishing step including a chemical mechanical polishing method for polishing the insulating film till at least either of the conductive layer and the magnetic layer in the element portion is exposed.

Incidentally, the insulating film to be formed on the surface of the specific plane of the substrate and the surface of the specific plane of the element portion may be made from a same material as that of any one of the plurality of insulating layers forming the element portion. Moreover, the second polishing step may further include a preliminary polishing step using an abrasive paste and a polishing plate composed of a soft metal, and the preliminary polishing step may be performed at a pre-step of the chemical mechanical polishing method. Furthermore, the chemical mechanical polishing method may use an abrasive liquid adjusted to be pH 5-7 and a chelating reagent as an additive.

DESCRIPTION OF THE PREFERRED EMBODIMENTS

The attached drawings are described while an embodiment of the present invention is described. Incidentally, as for each constituent element, an element having an operation similar to that of a constituent element in the aforesaid related art is designated by the same reference as that of the related art element. FIGS. 1A, 1B, 1C, 1D, 1E, 1F and 1G relate to a manufacturing method of a magnetic head according to the present invention, and sequentially show schematic cross sections of a magnetic head according to works to be performed.

Figure 1A:
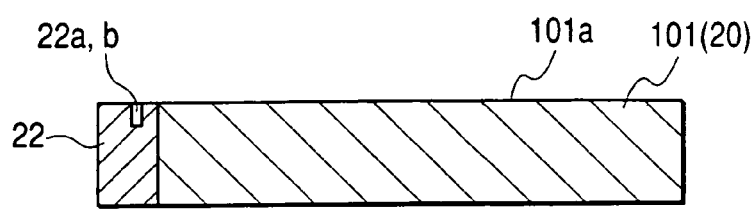
FIGS. 1A, 1B, 1C, 1D, 1E, 1F and 1G relate to a manufacturing method of a magnetic head according to the present invention, and sequentially show schematic cross sections of a magnetic head at each process.
Figure 1B:
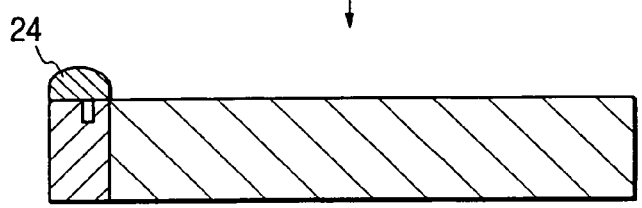
Figure 1C:
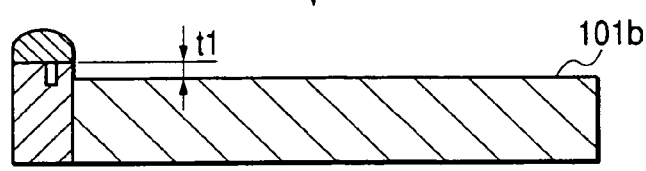
Figure 1D:
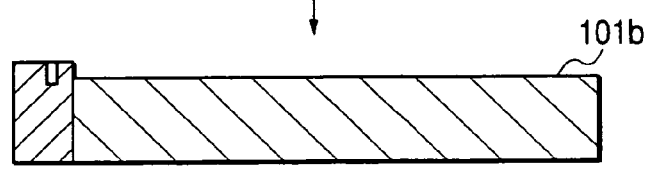

An element portion 22 including a reproducing element portion 22a and a recording element portion 22b is formed on an ALTIC board (in the upper portion on the left side end of a board 101 in the drawing). After that, in a first polishing process, the board surface 111a and a surface in the element portion continuing to the board surface 111a are polished with a diamond paste or the like (FIG. 1A). By the polishing, the flatness of the board 101, an MR height and the like are adjusted near to a desired values. Next, in a removal process, a photoresist 24 is coated and cured on the element portion 22 (FIG. 1B), and only the board surface 111a portion is scraped off up to a first predetermined depth t1 by ion milling or the like (FIG. 1C). After the completion of the ion milling, the photoresist 24 is removed (FIG. 1D).

Figure 1E:
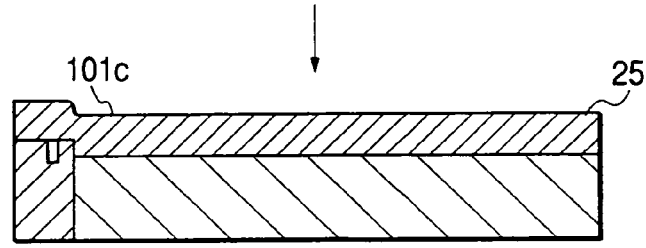
Figure 1F:
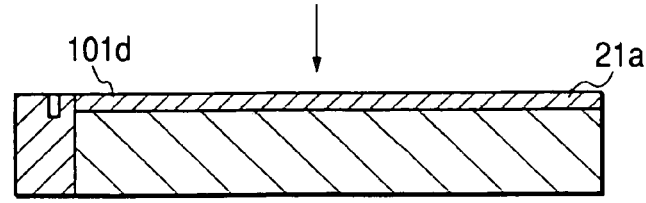
Figure 1G:
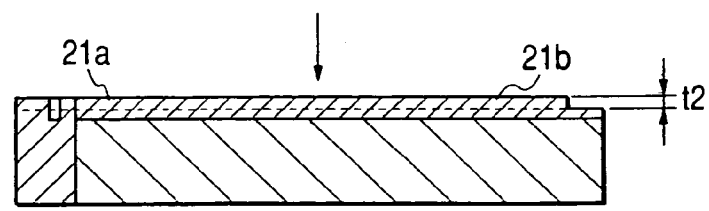

After that, in a film forming process, a film 25 of alumina being the insulating material used in the formation of the element portion 22 is formed on the board surface 101b after the ion milling and the element portion 22 (FIG. 1E). After the formation of the ceramic film 25 of alumina or the like, in a second polishing process, the surface 101c of the ceramic film 25 is polished up to the element portion 22 by a chemical mechanical polishing method (CMP), and further a very small amount of polishing is performed till the MR height becomes a predetermined value by the CMP (FIG. 1F). Through the process, the element forming surface in the element portion 22 and the surface of a rail 21a become the same surface 101d. After the completion of the CMP process, in a recessed portion forming process, a predetermined portion in the surface 110d is scraped up to a depth t2 by ion milling or the like, and a recessed portion 21b in the ABS is formed (FIG. 1G).

Generally, the milling speed of the ALTIC used as a board and the milling speed of an alumina film differ from each other. For example, if ion milling or the like is performed in the state in which the ALTIC is partially exposed up to the surface, it becomes very difficult to obtain a predetermined shape of the rail 21a or the flat recessed portion 21b. Because the present embodiment makes the depth t1 of milling at the time of scraping the board surface 110a to be a value equal to the depth t2 of the recessed portion 21b (or the height of the rail surface 21a) or more, the ALTIC being a material of the board 101 is not exposed even at the time of the formation of the recessed portion 21b. As a result, the predetermined shape of the rail 21a or the flat recessed portion 21b can easily be formed. Moreover, because the element portion 22 and the rail 21a are structured with the same material, the surface states of them after the CMP also become the same.

Furthermore, there are regions having different material characteristics mixedly on the surface of a composite ceramic such as the ALTIC and the like if the composite ceramic is observed microscopically. Consequently, the speed of milling is made to be different at every region when ion milling or the like is performed. Because the surface to be milled (or the surface 110c) is composed of alumina being a single material, it becomes possible to mill the whole of the surface to be milled at a uniform speed. Consequently, it becomes possible to obtain a flat surface.

Table 1 shows the results of the concrete examinations of the material dependence of surface roughness obtained by ion milling or reactive ion etching (RIE).

TABLE 1

MATERIAL DEPENDENCE OF SURFACE ROUGHNESS AFTER VARIOUS KINDS OF PROCESSING

|  | ALUMINA | ALTIC |
|---|---|---|
| SURFACE ROUGHNESS BEFORE ETCHING | 0.367 nm | 0.363 nm |
| AFTER COMPLETION OF 0.3 μm DEPTH MILLING | 0.381 nm | 4.939 nm |
| AFTER COMPLETION OF 3.0 μm DEPTH RIE | 0.279 nm | 23.685 nm |

As shown in the table, it is clear that the surface of the ALTIC is greatly roughened by ion milling or RIE. Consequently, by the selection of the surface material to be composed of a single material such as the aforesaid alumina, the recessed portion 21b having a smooth state surface is obtained. Accordingly, the rail 21a, the bottom face of the recessed portion 21b and the side wall portion of the recessed portion 21b are made to be structured by the use of alumina.

Figure 2:
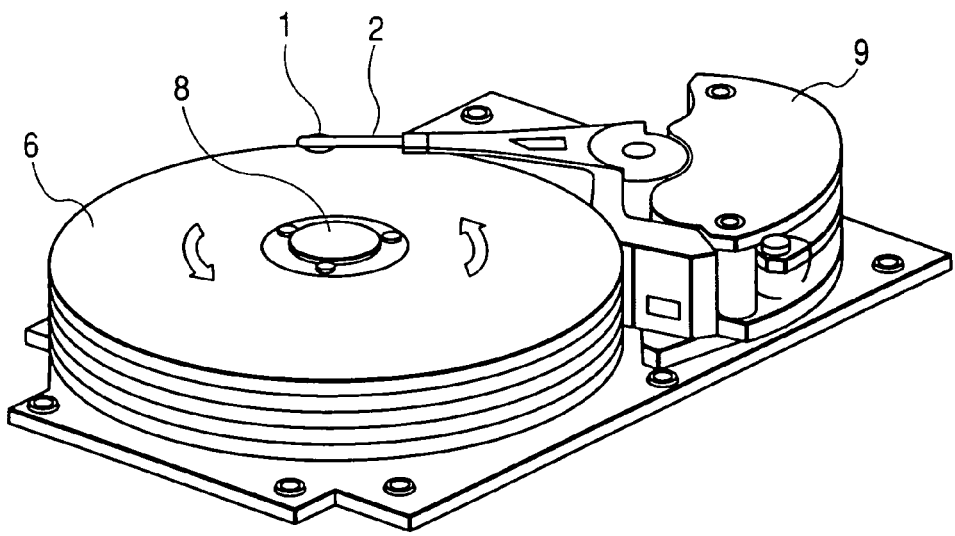
FIG. 2 is a drawing showing the schematic configuration of a magnetic disk device (HDD)

Next, a HDD and a head gimbal assembly, both using a magnetic head according to the present invention, are described. FIG. 2 shows a schematic configuration of a HDD mounting a magnetic head according to the present invention. The HDD is composed of a magnetic disk 6 being a magnetic recording medium, a spindle motor 8 for driving the magnetic disk 6 to rotate, a magnetic head 1 supported above the magnetic disk 6 by a gimbal 2, and a driving device 9 supporting the gimbal 2 and rotating the magnetic head 1 horizontally to the recording surface of the magnetic disk 6.

Figure 3:
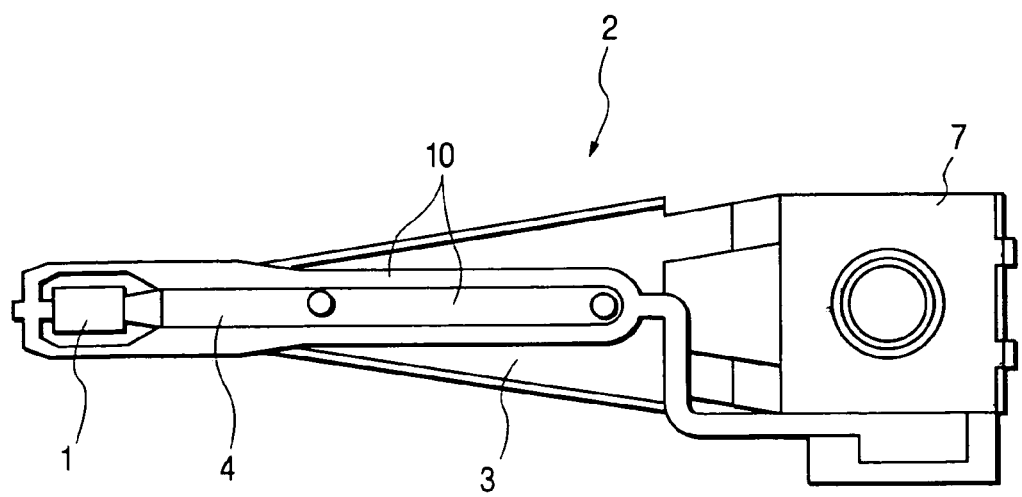
FIG. 3 is a drawing showing the schematic plane of a head gimbal assembly.
Figure 4:
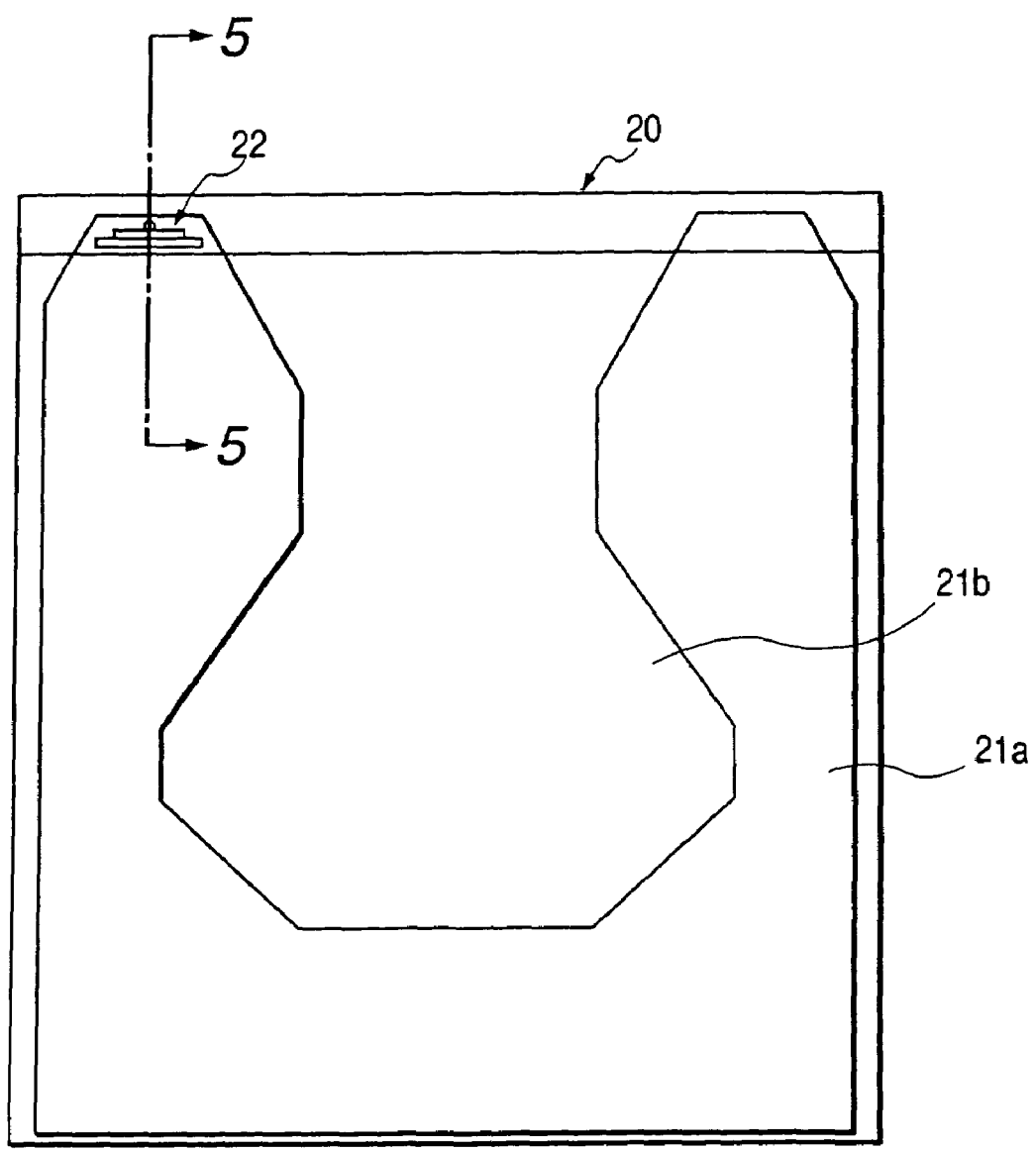
FIG. 4 is a drawing showing the state of a magnetic head in related art, viewed from the side of an ABS.
Figure 5:
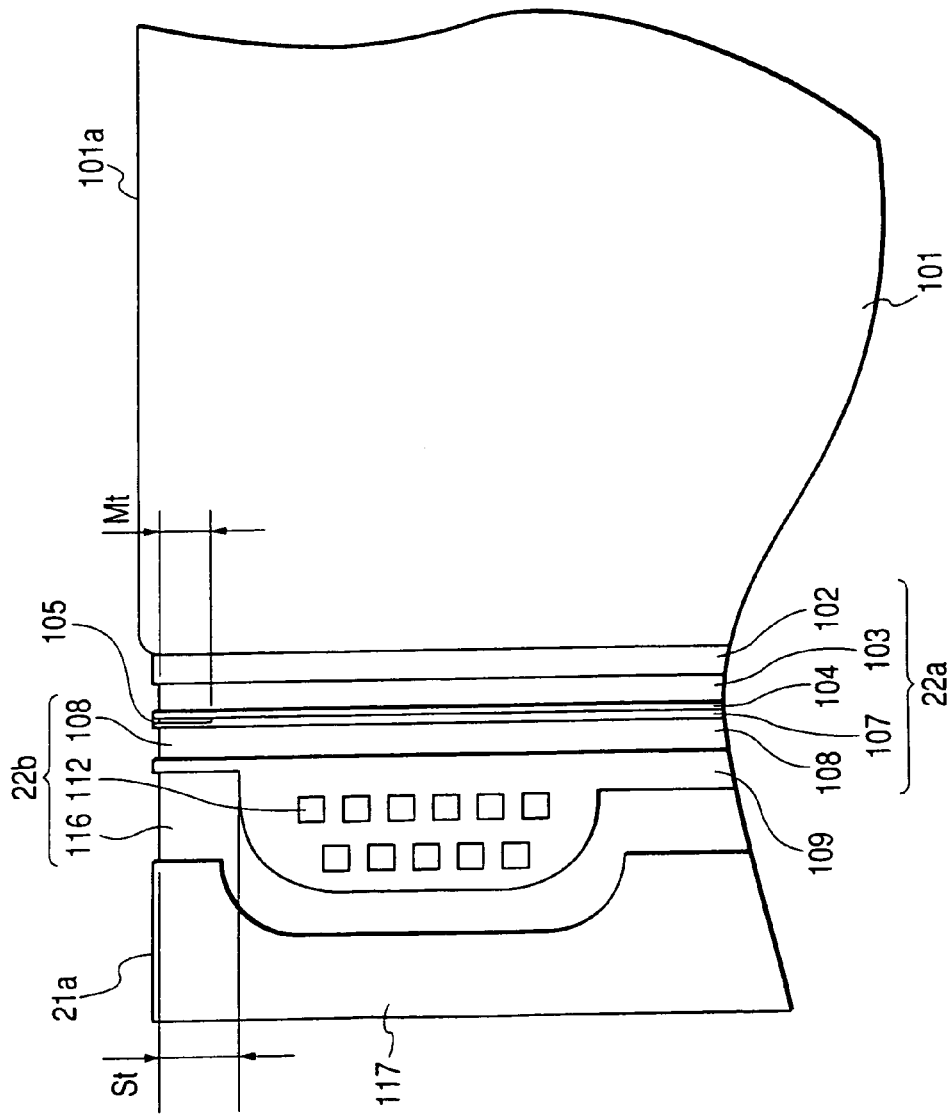
FIG. 5 is a macrograph of the principal part of the schematic cross section at the line 5-5 in FIG. 4.

In the HDD, the magnetic head is mounted as a head gimbal assembly. FIG. 3 shows a state of the head gimbal assembly, to which the magnetic head 1 according to the present invention is attached, when the head gimbal assembly is viewed from the upper part. The gimbal 2 is composed of a flexure 4 for giving a suitable degree of freedom to the magnetic head, a load beam 3 made of an elastic metal thin plate or the like, to which beam 3 the flexure 4 is pasted, and a base plate 7 fixed to the base portion of the load beam, which base portion is one end portion of the gimbal 2, to be supported by the driving device 9. The magnetic head 1 is supported at the other end of the gimbal 2, and the element portion thereof, which will be described later, is connected with a conductor pattern 10.

Incidentally, although the magnetic head includes both of the recording element and the reproducing element in the present embodiment, the present embodiment is not limited to the case. The present embodiment may be configured to include either of the recording element and the reproducing element. Moreover, in the present embodiment, ion milling is used in both the cases of scraping the board surface 110a by the depth t1 and of scraping at the time of the formation of the recessed portion 21b by the depth t2. However, the present invention is not limited to the use of the ion milling. Various kinds of methods such as RIE, reverse sputtering, etching using a liquid reagent, and the like may be used.

Moreover, although alumina is employed as the insulating films used in the element portion 22, the present invention is not limited to alumina. It is possible to use various kinds of insulating materials such as silicon, diamond-like carbon (DLC), silicon oxide, silicon nitride, titanium carbide and the like as long as they are insulating materials made of a single material. Moreover, the element portion is generally covered by a DLC film for the protection of the recording element and the reproducing element. The covering may appropriately be formed in the aforesaid methods. Furthermore, it is considerable that a plurality of kinds of insulating layers is used according to the configuration of an element. In such a case, it is preferable to use the insulating film having the maximum exposed area in the element portion at the time of the completion of the final process as the ceramic film 25.

Moreover, in the present embodiment, the CMP is employed as the polishing method for obtaining the surface 101c, and a polishing liquid adjusted to be pH 5-7 for preventing the formation of steps owing to the differences of the polishing speeds of the insulating layers, the magnetic layer and the conductive layer. The reason of the employment is as follows. That is, if it is tried to obtain the surface 101c by polishing using a surface plate composed of a soft metal and a diamond paste, there is the possibility of producing the work-affected layer in which, for example, crystal grains in a metal layer are inhibited or the like, for example, in the vicinity of the polishing portion of the reproducing element portion 22a owing to a shearing stress to be applied to the polishing portion at the time of polishing, or the like.

Because the CMP can perform the working with abrasive grains softer than the object to be worked, it is difficult that the work-affected layer is formed. Moreover, by the CMP, a reaction layer produced in a minute portion, contacted with the abrasive grains, on the surface of an object to be worked or the like is removed by a frictional force or the fretting operation of the abrasive grains, and the polishing is thereby advanced. Consequently, it is possible to obtain a highly accurate and extremely flat surface with great efficiency. Hence, through the CMP process, it becomes possible to make the MR height and the like to be predetermined values by removing the work-affected layer or without forming the work-affected layer.

Incidentally, because the speeds of forming the reaction layers in a portion composed of a ceramic and in a portion composed of a metal are different from each other, as a result, there is the possibility of producing steps between the element and the other portions, as it is described in regard to the related art. The present embodiment uses an abrasive liquid of pH 5-7, which liquid includes alumina grains as abrasive grains and an appropriate amount of EDTA (a chelating reagent).

Incidentally, if the pH value is smaller than 5, there is the possibility of remaining rust because it becomes impossible that the polishing speed of a magnetic pole portion made from a magnetic material such as Permalloy or the like catches up with the progress of the rapid oxidization of the magnetic pole portion, though the tendency depends on additives. Moreover, although the abrasive liquid is made to be alkaline for increasing the polishing speed of alumina in the CMP in the present embodiment, the polishing speed of alumina becomes too large if the value of pH is larger than 7. Consequently, there is the possibility that it becomes difficult to adjust the polishing speed to that in the portion made of a metal finely.

It is generally difficult to make the polishing speeds in a portion made of ceramic and in a portion made of a metal to be substantially equal to each other in a CMP using only a normal abrasive grains. However, a fixed polishing speed can be obtained by the adjustment of pH as described above, or concretely by the adjustment of the value of pH to be within the range of 5 to 7 in the configuration and the materials of the magnetic head described in regard to the present embodiment.

Moreover, there is the possibility that the value of pH and the polishing speed change as the progress of polishing only by the simple pH adjustment. Accordingly, the adjustment of the loading of the EDTA as well as the setting of the value of pH to be within the range of 5 to 7 is performed. Thereby, it becomes possible to fix the polishing speed of the portion made of a metal such as an element or the like and to control the polishing speed independently from the polishing speed of the portions made of a ceramic. The present embodiment prevents the producing of the aforesaid steps by using the abrasive liquid.

MODIFIED EXAMPLE

The upper part of the element portion of the surface 101c after the completion of the film forming process is projecting as shown in the drawing in the embodiment described above. It is necessary to polish the projecting portion at first for obtaining the predetermined polished surface 101d. As a result, the time needed for the second polishing process becomes long. It is considerable in this case to perform a preliminary polishing process using a conventional polishing plate composed of a soft metal and an abrasive paste such as a diamond or the like in advance before the CMP process as a modification of the embodiment described above for removing almost all the projecting portion in the preliminary polishing process.

In this case, the aforesaid steps and the work-affected layer, both being described above, are newly produced in the preliminary polishing process. However, it is possible to remove the steps and the layer at the time of the completion of the process by adjusting the loading of the EDTA in the CMP process to be optimum as to the steps and by setting the polished amount in the CMP process at a suitable value as to the work-affected layer. By the employment of the modification, it becomes possible to shorten the time necessary for the second polishing process greatly.

Incidentally, although the aforesaid embodiment is described with regard to a magnetic head including both the recording element and the reproducing element, the present invention is not limited to such a magnetic head. A magnetic head including only either of them may be used. Moreover, although the polishing by the CMP is performed till the element portion is exposed in the second polishing process, the polishing may be completed when either of the recording element and the reproducing element is exposed.

Furthermore, in the present embodiment, all of the insulating films to be used in the element portion 22 are made from alumina, and the ceramic film 25 is also made from alumina. However, the present invention is not limited to the material. The element portion 22 may be made from different kind insulating films such as silicon, diamond-like carbon (DLC), silicon oxide, silicon nitride, titanium carbide, and the like. In this case, the ceramic film 25 is not limited to the ceramic, and it is preferable to use the insulating film having the largest exposed area in the element portion at the time of the completion of the process as the ceramic film 25.

Moreover, although alumina is used as abrasive grains in the CMP, the present invention is not limited to alumina. Various abrasive grains to be used in the CMP generally may be used. Although the value of pH of the abrasive liquid is set to be within the range of 5 to 7, it is preferable to adjust the value appropriately according to the kind of a metal material or the required polishing speed. Similarly, as for the EDTA being an additive, too, the additive is not limited to EDTA as long as the additive enables the polishing of the element portion at a fixed speed even with the speeds at the other ceramic portions. Moreover, the second polishing process may be composed of a plurality of CMP processes in which abrasive grains, pH values and additives are different from each other according to the materials of an element portion.

Incidentally, the adjustment of the pH of abrasive liquid is performed in the CMP. However, if the value of pH is smaller than 5, there is the possibility of remaining rust because it becomes impossible that the polishing speed of a magnetic pole portion made from a magnetic material such as Permalloy or the like catches up with the progress of the rapid oxidization of the magnetic pole portion, though the tendency depends on additives. Moreover, although the abrasive liquid is made to be alkaline for increasing the polishing speed of alumina in the CMP in the present embodiment, the polishing speed of alumina becomes too large if the value of pH is larger than 7. Consequently, there is the possibility that it becomes difficult to adjust the polishing speed to that in the portion made of a metal finely.

It is generally difficult to make the polishing speeds in a portion made of ceramic and in a portion made of a metal to be substantially equal to each other in a CMP using only a normal abrasive grains. However, a fixed polishing speed can be obtained by the adjustment of pH as described above, or concretely by the adjustment of the value of pH to be within the range of 5 to 7 in the configuration and the materials of the magnetic head described in regard to the present embodiment. However, if the producing of the affected layer can be suppressed to a negligible level by, for example, setting the polishing speed to be variable or the like in the conventional polishing method, it is not necessary to dare to use the CMP.

By the implementation of the present invention, it becomes possible to obtain a magnetic head including an ABS composed of a flat and smooth worked surface and reduced steps to be produced between a rail portion on the ABS and an element portion.

By the implementation of the present invention, it becomes possible to prevent the producing of a work-affected layer or to remove a produced work-affected layer at the time of performing the working of a magnetic head for setting an MR height and the like at predetermined values, and thereby it becomes possible to provide a magnetic head superior in its electromagnetic conversion characteristics.

What is claimed is:

1. A method of manufacturing a magnetic head, comprising:
    forming an element portion, including a recording element and a reproducing element that has an MR (magneto resistive) element, by laminating a plurality of insulating layers, a conductive layer, and a magnetic layer on an end face of a substrate and by working each of the layers to a predetermined shape;
    polishing a substrate specific plane of said substrate, said substrate specific plane opposing a magnetic recording medium that said recording and reproducing elements respectively record information on or reproduce information from, and an element portion specific plane of said element portion, said element portion specific plane opposing said magnetic recording medium;
    removing only said substrate to lower said substrate specific plane to a first predetermined depth;
    forming an insulating film on a surface of said substrate specific plane, after lowering said substrate specific plane to the first predetermined depth of said substrate, and on a surface of said element portion specific plane;
    polishing said insulating film until at least one of the conductive layer and the magnetic layer in said element portion is exposed, said polishing of said insulating film including a chemical mechanical polishing that removes work-affected areas formed in the MR element by added shearing stress applied in at least one of said polishing of said specific planes and said polishing of said insulating film; and
    forming a recessed portion of said insulating film, after said polishing of said insulating film, said recessed portion having a predetermined shape and a second predetermined depth;
    wherein said first predetermined depth is deeper than said second predetermined depth.

2. A method of manufacturing a magnetic head according to claim 1, wherein said insulating film formed on the surface of said substrate specific plane and the surface of said element portion specific plane is comprised of a same material as at least one of the plurality of insulating layers forming said element portion.

3. A method of manufacturing a magnetic head according to claim 1, wherein said chemical mechanical polishing uses an abrasive liquid of pH 5-7.

4. A method of manufacturing a magnetic head according to claim 1, wherein the chemical mechanical polishing uses abrasive grains that are softer than the surfaces polished by said chemical mechanical polishing, and
    the surfaces polished by said chemical mechanical polishing include surfaces of said insulating film and at least one of said conductive layer and said magnetic layer.

5. A method of manufacturing a magnetic head, comprising:
    forming an element portion, including a recording element and a reproducing element that has an MR (magneto resistive) element, by laminating a plurality of insulating layers, a conductive layer, and a magnetic layer on an end face of a substrate and by working each of the layers to a predetermined shape;
    polishing a substrate specific plane of said substrate, said substrate specific plane opposing a magnetic recording medium that said recording and reproducing elements respectively record information on or reproduce information from, and an element portion specific plane of said element portion, said element portion specific plane opposing said magnetic recording medium;
    removing only said substrate to lower said substrate specific plane to a predetermined depth;
    forming an insulating film on a surface of said substrate specific plane, after lowering said specific plane to the predetermined depth of said substrate, and on a surface of said element portion specific plane; and
    polishing said insulating film until at least one of the conductive layer and the magnetic layer in said element portion is exposed, said polishing of said insulating film including a chemical mechanical polishing that removes work-affected areas formed in the MR element by added shearing stress applied in at least one of said polishing of said specific planes and said polishing of said insulating film.

6. A method of manufacturing a magnetic head according to claim 5, wherein said insulating film to be formed on the surface of said substrate specific plane and on the surface of said element portion specific plane is comprised of a same material as that of at least one of the plurality of insulating layers forming said element portion.

7. A method of manufacturing a magnetic head according to claim 6, wherein said chemical mechanical polishing uses an abrasive liquid of pH 5-7 and a chelating reagent as an additive.

8. A method of manufacturing a magnetic head according to claim 5, wherein said polishing of said insulating film further includes a preliminary polishing using a polishing plate including an abrasive paste and a oft metal, said preliminary polishing performed before said chemical mechanical polishing.

9. A method of manufacturing a magnetic head according to claim 8, wherein said chemical mechanical polishing uses an abrasive liquid of pH 5-7 and a chelating reagent as an additive.

10. A method of manufacturing a magnetic head according to claim 5, wherein said chemical mechanical polishing uses an abrasive liquid of pH 5-7 and a chelating reagent as an additive.

11. A method of manufacturing a magnetic head according to claim 5, wherein the chemical mechanical polishing uses abrasive grains that are softer than the surfaces polished by said chemical mechanical polishing, and said surfaces polished by said chemical mechanical polishing include surfaces of said insulating film and at least one of said conductive layer and said magnetic layer.

\* \* \* \* \*